(12) United States Patent
Prins

(10) Patent No.: US 6,426,999 B2
(45) Date of Patent: Jul. 30, 2002

(54) X-RAY APPARATUS INCLUDING A FILTER PROVIDED WITH FILTER ELEMENTS HAVING AN ADJUSTABLE ABSORPTION

(75) Inventor: Menno Willem José Prins, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/775,846

(22) Filed: Feb. 2, 2001

(30) Foreign Application Priority Data

Feb. 4, 2000 (EP) .............................. 00300913

(51) Int. Cl.$^7$ ................................. G21K 3/00
(52) U.S. Cl. ................. 378/156; 378/157; 378/158; 378/159
(58) Field of Search .............. 378/156, 157, 378/158, 159

(56) References Cited

U.S. PATENT DOCUMENTS

| | | | |
|---|---|---|---|
| 5,625,665 A | | 4/1997 | Fokkink et al. ............ 378/156 |
| 5,666,396 A | * | 9/1997 | Linders et al. ............ 378/156 |
| 5,768,340 A | * | 6/1998 | Geittner et al. ............ 378/159 |
| 5,966,426 A | * | 10/1999 | Marra et al. ............ 378/159 |
| 6,252,939 B1 | * | 6/2001 | Young et al. ............ 378/156 |
| 6,269,147 B1 | * | 7/2001 | Powell ............ 378/158 |

* cited by examiner

Primary Examiner—Robert H. Kim
Assistant Examiner—George Wang
(74) Attorney, Agent, or Firm—John F. Vodopia

(57) ABSTRACT

An X-ray apparatus with an X-ray source for producing a beam of X-rays, an X-ray detector for detecting the beam, and an X-ray filter with filter elements which is arranged between the X-ray source and the X-ray detector so as to attenuate the X-ray beam in each independent filter element individually. Each filter element can receive a liquid having electrically conducting properties and X-ray absorbing properties, the value of the X-ray absorption of the filter element being dependent on the level of the X-ray absorbing liquid in the filter element. Each filter element includes a first electrode (23) which is located in the wall of the filter element and on top of the substrate layer (38) in order to apply an electric potential to the wall of the filter element. A second electric potential is applied to the liquid via a second electrode. According to the invention the first electrode is segmented in the longitudinal direction z of the filter element in order to form the hold electrode segments (40) and barrier electrode segments (42) which form two corresponding electrode groups. The function of the hold segments (40) is to contain the liquid whereas the barrier segments (42) serve to produce potential barriers for the passage of the liquid in the longitudinal direction z of the filter element.

3 Claims, 3 Drawing Sheets

X-RAY APPARATUS INCLUDING A FILTER PROVIDED WITH FILTER ELEMENTS HAVING AN ADJUSTABLE ABSORPTION

BACKGROUND OF THE INVENTION

The invention relates to an X-ray apparatus which includes an X-ray source for producing X-rays, an X-ray detector for detecting the X-rays, a filter which is arranged between the X-ray source and the X-ray detector and includes a plurality of tubular filter elements having a longitudinal direction z and a circumference, the X-ray apparatus also including an electrical device for controlling the individual filter elements,

- each filter element having an internal volume for receiving a liquid filling having electrically conductive and X-ray absorbing properties, said filter element having an X-ray absorptivity which is dependent on the quantity of X-ray absorbing liquid present in the internal volume,
- each filter element being provided with a first electrode for applying a first electric potential to a wall of the filter element and a second electrode for applying a second electric potential to the internal volume of the filter element, and
- the X-ray absorptivity of each filter element being adjustable by step-wise control of a level of the X-ray absorbing liquid in the longitudinal direction z of the filter element.

DESCRIPTION OF RELATED ART

An X-ray apparatus of this kind which includes an X-ray filter is known from U.S. Pat. No. 5,666,396 (PHN 15.378). The known X-ray apparatus comprises a filter with a plurality of filter elements having individual absorptivities which are dependent on a level of a liquid filling present in the filter element. The X-ray apparatus is used inter alia for medical diagnosis where a patient to be examined is arranged between the X-ray source and the X-ray detector so as to image internal structures. Thanks to the fact that the patient has structures of different electron density, regions of different density are observed in a resultant X-ray image. The interval in density between regions with the extremes of the density in an X-ray image is defined as the dynamic range. The filter serves to limit a dynamic range for each X-ray image.

In order to limit the dynamic range of the object to be examined, the known X-ray apparatus includes a filter with filter elements provided with a bundle of tubes for receiving a liquid filling which is X-ray absorbing as well as electrically conductive. Each tube is connected to a common supply channel. Each filter element is provided with a first electrode which is arranged in a wall of the filter element in order to apply an electric voltage to the wall of the filter element. A second electrode is in contact with the liquid filling. The electric voltage applied to the first electrode of the filter element influences on the adhesion between the liquid filling having the electrical properties and an inner wall of the filter element; this adhesion determines whether the relevant filter element is filled with the liquid filling. The relative quantity of the liquid filling in individual filter elements is controlled on the basis of the electric voltages applied to individual filter elements. The known apparatus utilizes the phenomenon that a contact angle between an electrically conductive liquid and an electrode which is insulated therefrom is changed by applying a potential difference between the electrically conductive liquid and the electrode. This phenomenon is known as electrowetting. When electrowetting is applied to a tubular filter element which has an electrode arranged in the wall and is filled with an electrically conductive liquid filling, the level of the liquid filling in the filter element can be influenced thanks to the fact that the electrowetting force is directed in the longitudinal direction of the filter element, so that the degree of filling of the filter element can be increased or decreased as desired. In order to enable the potential difference to be realized between the liquid filling and the first electrode in the wall of the filter element, they are electrically insulated from one another by means of an insulation layer provided on the inner wall of the filter element. The known apparatus operates as follows: in the presence of a first value of the electric voltage, the adhesion of the liquid filling to the inner wall is increased and the relevant filter element is filled with the liquid filling from the supply channel. In the presence of a second value of the electric voltage the adhesion is reduced and the liquid filling is discharged from the filter element to the supply channel. Because of the X-ray absorbing properties, filter elements are adjusted to a high X-ray absorptivity by filling with the liquid filling; they are adjusted to a low X-ray absorptivity by keeping the filter elements empty.

It is a drawback of the known device that the filling of each filter element is controlled by application of a sequence of electric voltage pulses to the first electrode of the filter element so that the filter element is electrically charged. The level of the electric charge defines the degree of filling of the filter element. It has been found that the filling level of the filter element becomes poorly reproducible in the course of time. In practice it is often desirable to make the filling reproducible with an a priori known degree of discretization in order to achieve a reliable range of grey values.

SUMMARY OF THE INVENTION

It is an object of the invention to provide an X-ray apparatus which includes a filter provided with the filter elements whose X-ray absorptivity can be step-wise controlled in a reliable and reproducible manner. To this end, the X-ray apparatus according to the invention is characterized in that the first electrode is segmented in the longitudinal direction z of the filter element so as to form at least one sequence of alternating hold electrode segments and barrier electrode segments, the barrier electrode segments having a dimension in the longitudinal direction z of the filter element which is substantially smaller than that of the hold electrode segments, the hold electrode segments constituting a first group and the barrier electrode segments constituting a second group, the electrode segments in each group being electrically interconnected and the first group being electrically insulated from the second group, each group being individually controllable by the electrical device, the electrical device being arranged to apply pulse voltages to the second group and to supply the first group with voltages having a predetermined minimum value which suffices to fill the part of the internal volume which corresponds to the relevant hold electrode.

This step offers the desired effect, because each filter element has a stack of electrode segments in the longitudinal direction, the degree of segmentation being known a priori. Thanks to the fact that the successive electrode segments are electrically insulated from one another, the filter element can be step-wise filled because of the electrical properties of the liquid filling. The absolute value of the electric voltage applied to an individual electrode segment can be chosen to be such that the secondary effects on the reproducibility of the filling, that is, the orientation of the filter element relative to the force of gravity and the aging effects of the cover layer (being the protective layer between the insulation layer and the liquid filling) are compensated. In the filter element of the X-ray apparatus according to the invention a functional distinction is made between two types of electrode, that is, between hold electrodes and barrier electrodes. The function of hold electrodes is to transport the liquid filling in the longitudinal direction of the filter element. The barrier electrodes serve to create potential barriers between the hold electrodes. The activation or deactivation of a number of the potential barriers enables the step-wise filling of the filter element. These two types of electrode constitute the respective sub-groups of the electrode segments, which sub-groups are individually controlled by the electrical device. For efficiency of this method for transporting the liquid filling in the longitudinal direction of the filter element it is desirable first of all that the electrical device applies an electric potential to all hold electrodes in such a manner that the part of the internal volume which corresponds to the relevant hold electrode is filled with the liquid filling and secondly that it applies an electric potential to all barrier electrodes in such a manner that they can act as a potential barrier for the passage of the liquid filling. In order to deactivate the potential barrier a voltage pulse is applied to the barrier electrodes such that the liquid filling can pass these electrodes. The dimension of the hold electrode in the longitudinal direction of the filter element is greater than that of the barrier electrode and determines mainly the step size of the filling in the longitudinal direction of the filter element. The degree of discretization of the filter element is determined by a dimension of filling segments. In this context the filling segments are defined as an assembly of one hold electrode and one preceding barrier electrode, provided that there is a preceding barrier electrode. The dimension of each filling segment is determined by the sum of the dimensions of the hold electrode and the preceding barrier electrode in the longitudinal direction of the filter element. The filling segments constitute a series which includes at least one element. For the ease of explanation of the operation of the filter element of the X-ray apparatus according to the invention the filling segments are numbered so as to have a sequence number which is higher as the filling segment is situated further from the supply channel for the electrically conductive liquid. A number of different possibilities can be distinguished for explaining the process of the step-wise filling of the filter element. In order to realize a liquid filling having electrically conductive and X-ray absorbing properties, an electrically conductive and X-ray absorbing salt can be dissolved in a liquid (for example, water). This solution, consisting of one component, thus has electrically conductive as well as X-ray absorbing properties. It is also feasible to realize a liquid filling having said properties by dissolving a first substance having exclusively electrically conductive properties and a second substance having exclusively X-ray absorbing properties. The resultant liquid filling thus contains fully miscible liquid components. Another possibility is to form said liquid filling from a number of, for example, two, non-miscible liquid components, one of which has the required electrically conductive properties while the other has the required X-ray absorbing properties.

The operation of the filter element will now be described first of all for the first two above-mentioned cases where the liquid filling (for example, a salt solution or a liquid metal) consists of one liquid which is electrically conductive as well as X-ray absorbing. Furthermore, it is assumed that the filter element is initially empty, that the next electrode segment, as seen from the liquid supply channel, is a barrier electrode, that the meniscus of the liquid filling is situated in the vicinity of this barrier electrode, and that no potential difference is present as yet between the liquid filling and the first electrode. Furthermore, a distinction is made between a "filling" voltage for completely filling an electrode segment and a "draining" voltage for draining an electrode segment. In order to fill the filter element up to an $n^{+h}$ filling segment, the following steps must be executed. First of all, a "filling" voltage is applied to all hold electrodes. Secondly, a voltage pulse is applied to the next barrier electrode, the pulse length of said voltage pulse being such that the liquid filling passes the barrier electrode and fills the hold electrode. This results in the first filling segment being filled with the liquid filling. The above steps must be repeated up to and including the $(n-1)^{th}$ filling segment. By refraining from applying a "filling" voltage pulse to the barrier electrode of the $n^{th}$ filling segment, the liquid stops at the $n^{th}$ filling segment. For optimum effect of this control chart it is advantageous when the directly successive segments are arranged in the vicinity of one another in such a manner that the meniscus of the liquid filling in the preceding electrode segment "experiences" the electric field of the directly subsequent segment if an electric potential has been applied to the directly subsequent electrode segment.

As has already been started the liquid filling may also be composed of more, notably two, non-miscible liquid components. In that case the properties of the liquid components can be individually optimized, so that one liquid component has optimum electrically conductive properties and is hardly X-ray absorbing while the second liquid component has optimum X-ray absorbing properties and is electrically insulating. For an optimum effect of the filter element provided with the liquid filling consisting of two liquid components, the respective liquid columns should adjoin one another, so that a common interface is formed in the transverse direction. However, it is alternatively feasible that the two liquid components remain separated from one another by a gas layer. Furthermore, it must be possible to supply the liquid component from a respective supply channel. In that case the filter element is always filled with the liquid filling, the degree of X-ray absorption then being determined by the level of the X-ray absorbing liquid component in the filter element. In this case the operation of the filter element is similar to that of the described control chart. According to this method the level of the X-ray absorbing liquid component is determined passively by the level of the electrically conductive liquid component in the filter element and the maximum X-ray absorption is reached when the filter element is completely filled with the X-ray absorbing liquid component.

For simplicity of the electrical control all hold electrodes and all barrier electrodes are electrically interconnected and constitute the first group and the second group, respectively.

In practice it is desirable to provide a filter element having a multiple degree of discretization of the absorptivity so as to realize a range of grey values in an X-ray image. To this end, a first embodiment is characterized in that the first group includes more than one hold electrode segment and the second group includes more than one barrier electrode segment.

It may be advantageous to make the edges of the directly successive segments overlap one another in space. To this end, a second embodiment according to the invention is characterized in that facing edges of directly successive electrode segments are provided with meshing teeth. This step ensures that the meniscus of the liquid filling is in contact with a part of the edge surface of the next segment, so that the distance between the neighboring segments becomes less critical.

BRIEF DESCRIPTION OF THE DRAWINGS

These and other aspects of the invention will be described in detail hereinafter with reference to the following embodiments and the accompanying drawing in which corresponding reference numerals denote corresponding elements; therein

DETAILED DESCRIPTION OF THE INVENTION

Figure 1:
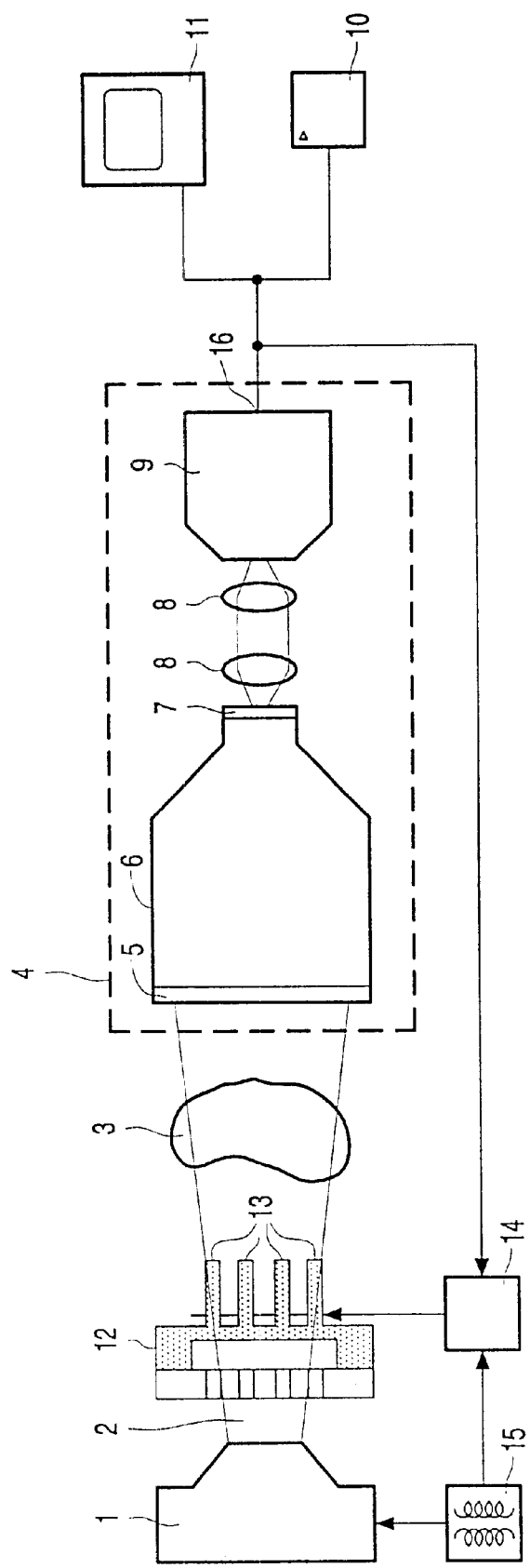
FIG. 1 shows diagrammatically an X-ray apparatus according to the invention.

FIG. 1 shows diagrammatically an X-ray apparatus with a filter according to the invention. The X-ray source 1 emits an X-ray beam 2 whereto an object 3, for example a patient to be examined, is exposed. Due to local differences in the absorption of X-rays in the object 3, an X-ray image is formed on the X-ray detector 4, being an image intensifier pick-up chain in the present example. The X-ray image is formed on the entrance screen 5 of the X-ray image intensifier 6 and is converted into an optical image on the exit window 7 which is imaged on a video camera 9 by means of a system of lenses 8. The video camera 9 forms an electronic image signal from the optical image. For example, for the purpose of further processing the electronic image is applied to an image processing unit 10 or to a monitor 11 on which the image information contained in the X-ray image is displayed.

A filter 12 for locally attenuating the X-ray beam 2 is arranged between the X-ray source 1 and the object 3. The filter 12 includes a plurality of tubular filter elements 13, the X-ray absorptivity of which is adjustable by application, by way of an adjusting circuit 14, of electric voltages to the wall of the filter elements. The electric voltages are adjusted, for example, on the basis of the setting of the X-ray source 1 with the power supply 15 of the X-ray source and/or on the basis of, for example, brightness values of the X-ray image which can be derived from the signal present at the output terminal 16 of the video camera 9. The general construction of such a filter 12 and the composition of the absorption liquid are described in detail in United States patent U.S. Pat. No. 5,625,665 (PHN 15.044).

Figure 2A:
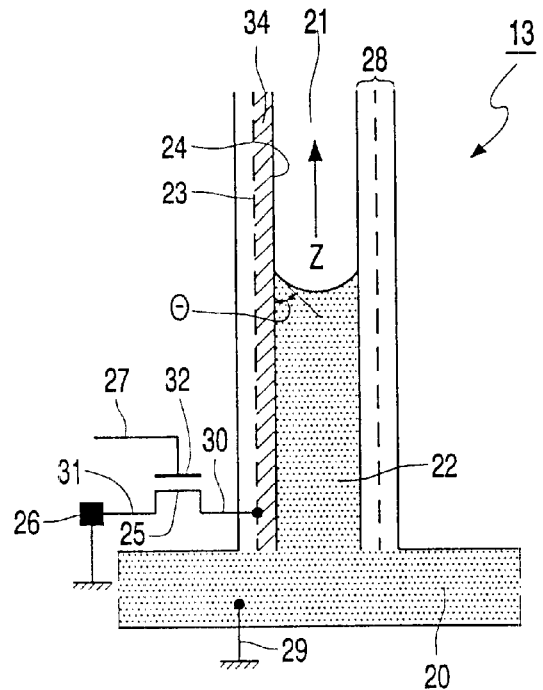
FIG. 2a is a diagrammatic sectional view of a filter element of the filter of FIG. 1 which is filled with the liquid filling consisting of two fully miscible liquid components.

FIG. 2a is a diagrammatic sectional view of a tubular filter element 13 of a filter as shown in FIG. 1. Via the supply channel 20 the filter element 13 is filled with the liquid filling 22 which is electrically conductive and X-ray absorbing. For each filter element there are defined the longitudinal direction z and the internal volume 21, the latter being bounded by the walls 28 of the filter element. Each filter element includes a first electrode 23 in the form of an electrically conductive layer which is electrically insulated, by means of an insulation layer 34, from the liquid filling present in the internal volume 21, an inert cover layer 24 which is provided on an inner side of the walls 28, and a second electrode 29 for applying an electric potential to the liquid filling. The first electrode 23 of the filter element 13 is coupled to a switching element which is in this case formed by a drain contact 30 of a field effect transistor 25, its source contact 31 being coupled to a voltage line 26 which forms part of an electrical control device (not shown). The field effect transistor 25 is turned on, that is, the switching element is closed, by means of a control voltage which is applied to a gate contact 32 of the field effect transistor 25 via the control line 27. The electric voltage of the voltage line 26 is applied to the first electrode 23 by closing the switching element. When the voltage line is adjusted to the value of the "filling" voltage, the contact angle θ of the liquid filling 22 relative to the inert cover layer 24 decreases and the relevant filter element is filled with the liquid filling.

Figure 2B:
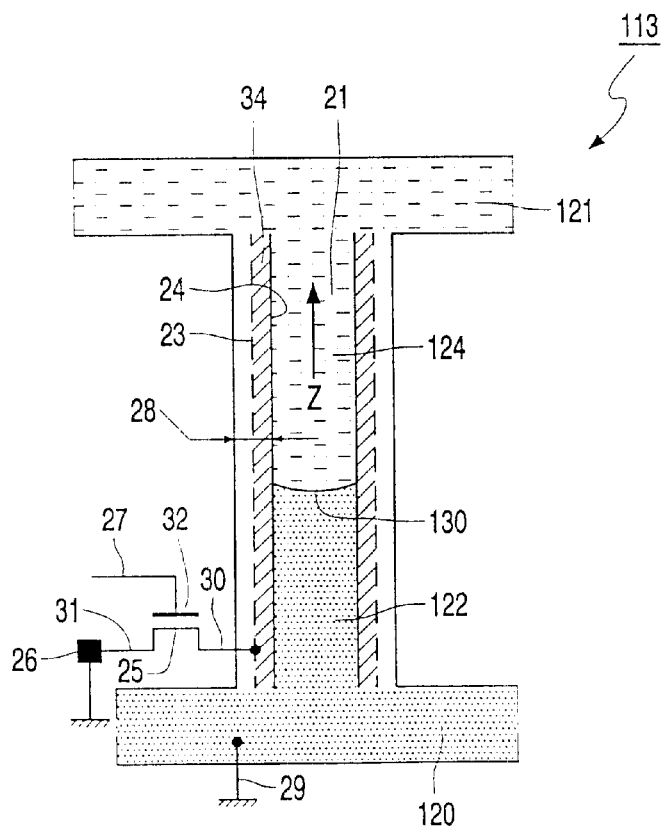
FIG. 2b is a diagrammatic sectional view of a filter element of the filter of FIG. 1 which is filled with the liquid filling consisting of two non-miscible liquid components.

FIG. 2b is a diagrammatic sectional view of the tubular filter element 113 of a filter as shown in FIG. 1, the filter element now being filled with the liquid filling consisting of an electrically conductive liquid component 122 and an X-ray absorbing liquid component 124. The liquid components are supplied via respective supply channels 120 and 121. The further functional parts of the filter element 113 are substantially identical to those of the filter element 13, so that the control chart for the electrically conductive liquid component can be similar. This control chart determines the level of the electrically conductive liquid component 122 in the internal volume 21 of the filter element 113 which itself determines the level of the X-ray absorbing liquid component 124 in the filter element 113, because the respective components constitute one common liquid column with an interface 130. The degree of X-ray absorption is in this case determined by the degree of filling of the filter element 113 with the X-ray absorbing component 124.

Figure 3:
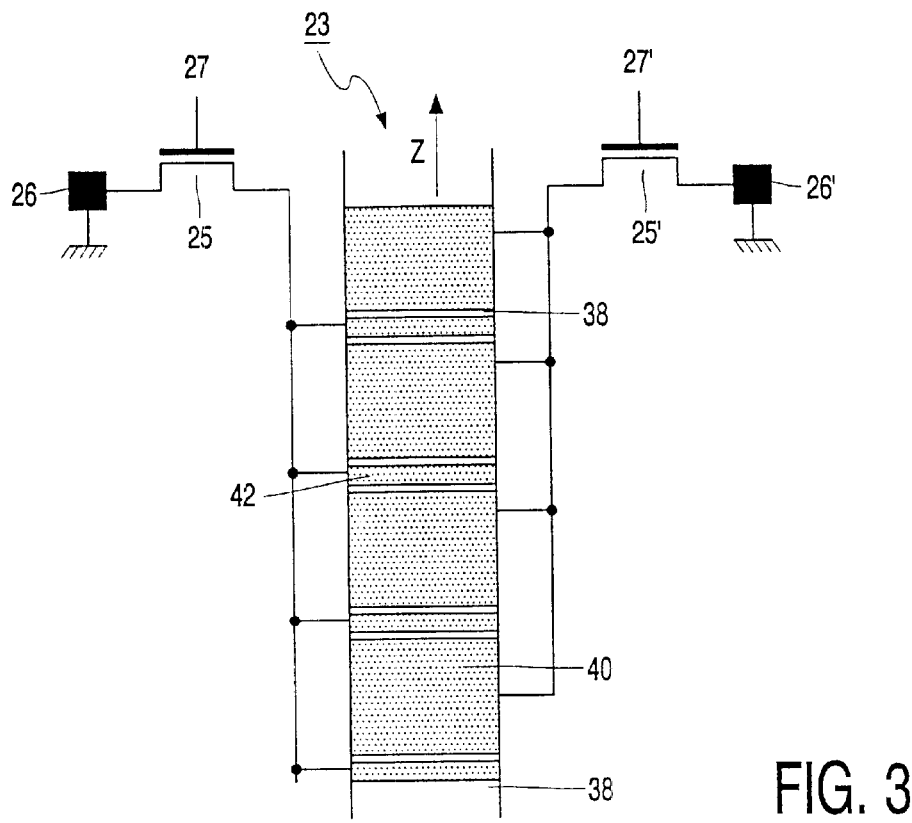
FIG. 3 is a diagrammatic 360° view of the first electrode, two groups of electrode segments being indicated.

FIG. 3 is a 360° view of the electrode 23 on a substrate 38 in a first embodiment of the filter element according to the invention, the first electrode including a plurality of respective hold electrodes and barrier electrodes. The first group of electrode segments includes all hold electrodes 40 and the second group of electrodes segments includes all barrier electrodes 42. The two groups are electrically insulated from one another and can be individually controlled by the electrical device. The connection of each group to a voltage line 26 and 26', respectively, of the electrical device is realized via the respective switching elements 25 and 25', the voltage line 26' applying a voltage which assumes a predetermined minimum value which suffices to fill the relevant hold electrode whereas the voltage line 26 applies a pulsed voltage which suffices for the liquid filling to pass the barrier electrode. In this embodiment the field effect transistors again act as switching elements. The hold electrodes 40 serve for the transport of the liquid filling in the longitudinal direction z of the filter element, the barrier electrodes 42 performing the function of a potential barrier for the passage of the liquid filling. In order to make the liquid filling pass a barrier electrode, a "filling" voltage pulse must be applied to the relevant threshold electrode via the voltage line 26. As soon as the meniscus of the liquid filling is present in the next hold electrode, this "filling" voltage pulse for the second group must be terminated, unless transport of the liquid filling to the next hold electrode is desired. For optimum transport of the liquid filling in the longitudinal direction z of the filter element it is desirable that the electrical device includes a timer unit capable of adjusting and, if necessary, varying the duration of the voltage pulses applied to the barrier electrodes.

Figure 4:
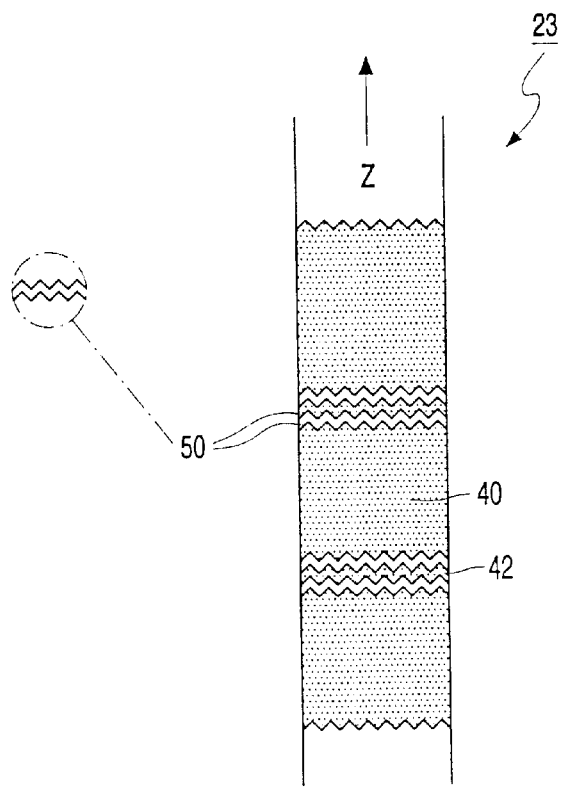
FIG. 4 is a diagrammatic 360° view of the first electrode, the electrode segments being provided with teeth.

FIG. 4 is a diagrammatic 360° view of the electrode 23 of the filter element in another embodiment wherein the facing edges 50 of directly successive electrode segments 40 and 42 are provided with meshing teeth. This step enhances the reliability of the transport of the liquid filling in the longitudinal direction z of the filter element. The embodiment shown exhibits sawtooth-like teeth, but teeth of another geometry, for example crenellations, are also possible of course.

What is claimed is:

1. An X-ray apparatus which includes an X-ray source (1) for producing X-rays (2), an X-ray detector (4) for detecting the X-rays, a filter (12) which is arranged between the X-ray source and the X-ray detector and includes a plurality of tubular filter elements (13) having a longitudinal direction z and a circumference, the X-ray apparatus also including an electrical device (14) for controlling the individual filter elements, each filter element (13) having an internal volume (21) for receiving a liquid filling (22) having electrically conductive (122) and X-ray absorbing (121) properties, said filter element having an X-ray absorptivity which is dependent on the quantity of X-ray absorbing liquid (121) present in the internal volume (21), each filter element (13) being provided with a first electrode (23) for applying a first electric potential to a wall (28) of the filter element and a second electrode (29) for applying a second electric potential to the internal volume (21) of the filter element, and the X-ray absorptivity of each filter element (13) being adjustable by step-wise control of a level of the X-ray absorbing liquid (21) in the longitudinal direction z of the filter element, characterized in that the first electrode (23) is segmented in the longitudinal direction z of the filter element (13) so as to form at least one sequence of alternating hold electrode segments (40) and barrier electrode segments (42), the barrier electrode segments having a dimension in the longitudinal direction z of the filter element (13) which is substantially smaller than that of the hold electrode segments, the hold electrode segments (40) constituting a first group and the barrier electrode segments (42) constituting a second group, the electrode segments in each group being electrically interconnected and the first group being electrically insulated from the second group, each group being individually controllable by the electrical device, the electrical device being arranged to apply pulse voltages to the second group and to supply the first group with voltages having a predetermined minimum value which suffices to fill the part of the internal volume which corresponds to the relevant hold electrode.

2. A filter for use in the X-ray apparatus as claimed in claim 1, wherein the first group includes more than one hold electrode segment (40) and the second group includes more than one barrier electrode segment (42).

3. A filter for use in the X-ray apparatus as claimed in claim 1, wherein facing edges of directly successive electrode segments (40, 42) are provided with meshing teeth (50).

* * * * *